United States Patent [19]

Manos

[11] 4,068,387

[45] Jan. 17, 1978

[54] SOLVENT DRYING OF CELLULOSE ESTER MEMBRANES

[75] Inventor: Philip Manos, Wilmington, Del.

[73] Assignee: E. I. Du Pont de Nemours and Company, Wilmington, Del.

[21] Appl. No.: 702,449

[22] Filed: July 6, 1976

[51] Int. Cl.$^2$ .............................................. F26B 5/00
[52] U.S. Cl. ........................................... 34/9; 106/189
[58] Field of Search ............................ 34/9, 106, 189

[56] References Cited

U.S. PATENT DOCUMENTS

| 1,846,474 | 2/1932 | Darling | 34/9 |
|---|---|---|---|
| 3,592,672 | 7/1971 | Rowley et al. | 106/189 |
| 3,710,945 | 1/1973 | Dismore | 210/321 |
| 3,732,627 | 5/1973 | Wertheim | 34/9 |
| 3,842,515 | 10/1974 | MacDonald et al. | 34/9 |
| 3,962,798 | 6/1976 | Jackson | 34/9 |

*Primary Examiner*—John J. Camby

[57] ABSTRACT

Process for drying a water-wet permselective cellulose ester membrane by contacting the membrane with a single water replacement liquid and vaporizing the liquid from the membrane.

9 Claims, No Drawings

SOLVENT DRYING OF CELLULOSE ESTER MEMBRANES

BACKGROUND OF THE INVENTION

Separation processes such as dialysis, ultrafiltration, and reverse osmosis have been used in the separation of a wide variety of impurities for solutions. The development and improvement of membranes for such systems has permitted their use, for example, in the desalination of brackish and saline waters.

The eminent success of the membranes used in permselective applications has prompted consideration of their use in the separation of gases. Such membranes are generally prepared in a water-wet condition, and various techniques have been tested for removal of the water to dryness. Direct drying techniques, however carefully controlled, seem unsatisfactory. The replacement of the water with a series of polar and non-polar liquids has met with some success in the drying of cellulose acetate membranes. However, a continuing need exists for a drying process for cellulose acetate and other cellulose ester membranes which is more efficient than the multi-step techniques previously used.

SUMMARY OF THE INVENTION

The instant invention provides a rapid process for the commercial drying of water-wet separatory membranes which requires fewer process steps than techniques previously used.

Specifically, the instant invention provides a process for drying water-wet, semi-permeable cellulose ester membrane by contacting the membrane at a temperature of about from 0° to 50° C with volatile solvent having a boiling point below about 175° C to substantially completely remove water from the membrane, the volatile solvent (a) being inert to the membrane and the membrane wetting liquid and having (b) a solubility parameter not greater than about 8.4 cal.$\frac{1}{2}$cc.$^{-3/2}$ and (c) a hydrogen bonding component of the solubility parameter not greater than about 2.5 cal.$\frac{1}{2}$cc.$^{-3/2}$; and vaporizing the volatile solvent from the membrane.

DETAILED DESCRIPTION OF THE INVENTION

Membranes which can be dried according to the instant invention include semi-permeable membranes of cellulose ester polymers which rely at least in part on their physical structure for their performance. Included are membranes which are asymmetric, being formed with a relatively dense skin on one surface of a more porous structure. Cellulose esters which can be used in the preparation of these membranes include the fatty carboxylates, such as cellulose acetate and cellulose acetate butyrate. The instant process is particularly applicable to membranes of cellulose acetate polymers wherein the degree of acetylation is about from 2.2 to 2.8. These polymers and membrane preparation are described in greater detail in Loeb et al. U.S. Pat. No. 3,283,042 and MacDonald U.S. Pat. No. 3,842,515.

The membranes can be in any form presenting a surface suitable for its permselective use, such as a self-supporting film, hollow fibers and composite structures wherein the permselective polymer surmounts and is supported by a structure of a different composition, such as a porous polymer, glass or ceramic. Hollow fiber membranes present high surface areas and are preferred.

The membranes dried by the instant process are water-wet. In the context of the present invention, the term "water-wet" is understood to mean that a major portion, that is, at least about 50 weight percent, of the liquid with which the membrane is wet is water. The remainder of the liquid with which the membrane is wet can be any polar or non-polar liquid.

In accordance with the instant invention, the water-wet membrane is contacted with a volatile solvent to substantially replace the water contained in the membrane. The volatile solvent should be sufficiently inert to both the membrane and the non-aqueous components of the wetting liquid to avoid any significant depreciation of membrane properties. The volatile solvents used in the instant process have a solubility parameter not greater than about 8.4 cal.$\frac{1}{2}$cc.$^{-3/2}$, and preferably not greater than about 8.0. The hydrogen bonding component of the solubility parameter is not greater than about 2.5 cal.$\frac{1}{2}$cc.$^{-3/2}$. The solubility parameter is the total solubility parameter of the liquid, designated as $\delta_o$, or the square root of the cohesive energy density of the liquid, and the hydrogen bonding parameter, $\delta_h$, is a component of the total solubility parameter, as recognized in the art and described in detail in Barton, Chemical Reviews, Vol. 75, page 731 (1975). In addition, the volatile solvent will normally have a surface tension below about 25 dynes cm.$^{-1}$ at 20° C, and preferably below about 20 dynes cm.$^{-1}$. Satisfactory functioning of a volatile solvent in the instant process is not uniformly achieved outside of these limitations. While good results have previously been obtained with $CCl_4$ and $Cl_2C = CCl_2$, such processes are erratic and lack sufficient reproducibility for commercial operations.

A wide variety of volatile solvents exhibiting these characteristics can be used in the present process, including, for example, aliphatic or cycloaliphatic hydrocarbons, aliphatic hydrocarbons, aliphatic ethers, and mixtures of one or more of these solvents. Representative aliphatic and cycloaliphatic hydrocarbons include butane, pentane, hexane, 2-methylpentane, heptane, isooctane, decane, cyclohexane, 1-hexene, cyclohexene, and diisobutylene. Representative halocarbons which can be used in the process include dichlorodifluoromethane, trichlorofluoromethane, dibromodifluoromethane, 1,1,2-trichloro-1,2,2-trifluoroethane, 1,2-dichloro-1,1,2,2-tetrafluoroethane and tertiary butyl chloride. Representative ethers which can be used in the process are dimethyl ether, methyl ethyl ether, and diethyl ether. These volatile solvents can, of course, contain minor amounts of other components that do not materially effect their performance in the instant process.

The representative solvents listed above are either liquid at ambient temperatures or condensible to liquids at superatmospheric pressures within the temperature range of about from 0° to 50° C. Aliphatic hydrocarbons and halocarbons have been found to be particularly satisfactory in the instant process, especially those that are normally liquid and boil below about 100° C. Of these, 1,1,2-trichloro-1,2,2-trifluoroethane ("Freon" 113), n-hexane and n-heptane give particularly sastisfactory results.

The contacting of the water-wet membrane with the volatile solvent can be carried out by any convenient means, including immersion, dipping or spraying the water-wet membrane. The volatile solvent can also be added to an aqueous bath in which the water-wet membrane is already submerged. The period that the water-wet membrane should be contacted with the volatile solvent will vary with the types and quantities of the solvents used, and will generally be adjusted to obtain substantial equilibrium between the membrane liquid and the volatile solvent. Substantially complete equilibrium is generally obtained in about from 1 to 24 hours of immersion but excellent results can be obtained in shorter contact times.

The volatile solvent can be brought into contact with the water-wet membrane in various ways. However, in all cases, the water-wet membrane is repeatedly contacted with the solvent to substantially completely remove water from the membrane. Accordingly, the last quantity of volatile solvent with which the water-wet membrane is contacted comprises substantially non-aqueous volatile solvent.

The membrane is generally contacted with the volatile solvent at a temperature of about from 0° to 50° C, since operating difficulties are encountered below the freezing temperature of water, and less satisfactory results are often obtained above 50 ° C. However, operating temperatures somewhat higher than 50 ° C can be used if the membrane is of a polymer having a glass transition temperature higher than that of cellulose acetate.

The proportion of volatile solvent to membrane water can vary widely. In general, in any one contact about from 1 to 1000, more usually 10 to 500, volumes of solvent per volume of membrane water are used. While larger and smaller volumes can be used in any particular step, they are not always convenient to handle. As with extraction in general, a multiplicity of extractions at convenient to handle volume ratios are more efficient to conduct than a single extraction involving a relatively large volume ratio.

The substantially complete removal of water from the membrane can accordingly be effected by adjustment of the volume of volatile solvent used to contact the water-wet membrane, with replacement or treatment of the volatile solvent to renew its capacity to absorb the membrane water. A particularly satisfactory embodiment of this concept involves the removal of water azeotropically since the solvents involved inherently form azeotropes with water, permitting the continual removal of the azeotrope, separation of water therefrom and returning the volatile solvent to the treating vessel until the membrane water is substantially completely removed. A particularly effective method of removal of water from an azeotrope is by azeotropic distillation.

The removal of water from the membrane can also be facilitated by the presence of a suitable water absorbent in the volatile solvent, such as a desiccant that forms hydrates, such as sodium sulfate, natural clays, diatomaceous earth, silica or alumina gel. Particularly satisfactory synthetic desiccants are those crystalline metal aluminosilicate molecular sieves commercially available from the Linde Division of Union Carbide Corporation as Types 3A, 4A and 5A, as well as those described by Hersh in "Molecular Sieves," Reinhold, New York (1961). The molecular sieve and the liquid components used in the drying process are chosen to provide sieve openings large enough to accomodate the molecule to be removed from the membrane but too small for the solvent molecules being used to replace it.

After substantially complete removal of water from the membrane by replacement of the volatile solvent, the solvent can then be removed directly by vaporization to yield a substantially dry permselective cellulose ester membrane. Alternatively, the liquid-wet membrane can be rinsed one or more times with solvents other than the water replacement liquid. Particularly useful in such further rinses are those solvents having a solubility parameter not greater than about 8.0 cal.$^{\frac{1}{2}}$ cc$^{-1/3}$, a surface tension not greater than about 20 dynes/cm and a boiling point less than about 100° C.

The dried membranes are particularly effective in the separation of gaseous mixtures, with excellent permeation rates and selectivities. Representative of such gaseous mixtures are those found in a wide variety of industrial exhaust streams. For example, the membranes resulting from the instant process can be used to markedly increase the concentration of hydrogen in mixtures of hydrogen, nitrogen, methane, argon and ammonia typically resulting from the synthesis of ammonia. In addition, the dry membranes can be used for the separation of hydrogen and carbon monoxide, helium from natural gases such as air, hydrogen from petrochemical process streams, oxygen from air, hydrogen from ammonia and, in general, the separation of one rapidly diffusing gas from less permeable gases.

The invention is further illustrated by the following specific examples, in which weights and percentages are by weight unless otherwise indicated.

The membrane used in the examples was a commercial cellulose acetate reverse osmosis membrane in the form of hollow fibers having an outside diameter of 235 microns and an inside diameter of 81.3 microns. The membrane, which was obtained water-wet and was kept wet with water prior to use herein, contained 1.25 grams of water per gram of polymer on a dry weight basis, and the polymer had a degree of acetylation equal to about 2.6.

EXAMPLES 1-3, 13, 19, 21 AND 22

In each example, the water-wet cellulose acetate hollow fiber membrane weighing about 0.20 g on a dry basis was coiled as a 10-fiber skein loop about 84 cm long, the excess water was shaken off, and immersed in about 100 ml of the solvent containing about 50 g Molecular Sieve 3A and providing about 400 volumes of solvent for each volume of water in the membrane. After soaking the membrane for the period of time and at the temperature specified in the Table, the liquid remaining adherent to the membrane was evaporated at 22° C either under reduced pressure or at atmospheric pressure in dry air as shown in the Table.

EXAMPLES 5-7, 10, 11, 20 AND COMPARATIVE EXAMPLES A, B, C, E, F, AND J

In each example, the water-wet membrane weighing about 0.20 g on a dry basis was coiled as a 10-fiber skein loop about 84 cm long, the excess water was shaken off, and immersed in about 100 ml of the solvent maintained either at the boiling point or at 50° C and providing about 400 volumes of solvent for each volume of water in the membrane. After soaking the membranes for 10 or 30 minutes, the liquid remaining adherent to the membranes was evaporated at ambient temperature either at atmospheric pressure in dry air or under reduced pressure as shown in the Table.

EXAMPLES 4, 8, 9, 12, 14, 18 AND COMPARATIVE EXAMPLES D, G AND H

In each example, the water-wet membrane weighing about 0.10 g on dry basis and wet with water (0.125 g)

was coiled as a 5-fiber skein loop about 84 cm long, the excess water was shaken off, and immersed in about 190 ml of the solvents containing about 50 g Molecular Sieve 3A and providing about 800 volumes of solvent for each volume of water in the membranes. After soaking the membrane for the period of time and at the temperature specified in the Table, the liquids remaining adherent to the membranes were evaporated at 22° C under reduced pressure.

The gas separation properties of the dry membranes resulting from all examples were determined by standard techniques. The Helium Flux in nGTR, or cc(NTP)/sec·cm$^2$·cm Hg.10$^{-9}$, as well as the He/N$_2$ selectivity ratio, are given in the Table.

above, the thus-dried fiber exhibited an He flux of 756,000 nGTR and a He/N$_2$ selectivity of 49.

I claim:

1. A process for drying water-wet, semipermeable cellulose ester membrane by contacting the membrane at a temperature of about from 0° to 50° C with volatile solvent having a boiling point below about 175° C to substantially completely remove water from the membrane, the volatile solvent (a) being inert to the membrane and the membrane wetting liquid and having (b) a solubility parameter not greater than about 8.4 cal.$^{\frac{1}{2}}$cc.$^{-3/2}$ and (c) a hydrogen bonding component of the solubility parameter not greater than about 2.5 cal.$^{\frac{1}{2}}$cc.$^{-3/2}$; and vaporizing the volatile solvent from the

TABLE

| Ex. | Solvent | Solvent Ratio* | Contact Time, Hr. | Temp. °C | Desiccant | Solvent Hr. | Solvent °C. | Evap. Mode | Dynes cm$^{-1}$ $\delta$ | $\delta_o$ | Cal$^{1/2}$ cm$^{-3/2}$ $\delta_h$ | He Flux nGTR | Selectivity He/N$_2$ |
|---|---|---|---|---|---|---|---|---|---|---|---|---|---|
| 1 | "Freon"—113 | 400 | 0.17 | 48 | a | 20 | 22 | Vac. | 17.3 | 7.2 | 0 | 576 M | 39 |
| 2 | " | " | 1 | 22 | a | 2 | " | Air | | | | 301 M | 51 |
| 3 | " | " | 20 | " | a | " | " | " | | | | 510 M | 28 |
| 4 | " | 800 | 20 | " | a | 20 | " | Vac. | | | | 757 M | 36 |
| 5 | " | 400 | 0.17 | 48 | None | 1 | " | Air | | | | 402 M | 45 |
| 6 | " | " | 0.17 | 48 | " | " | " | " | | | | 442 M | 39 |
| 7 | " | " | 0.5 | 48 | " | " | " | " | | | | 631 M | 43 |
| 8 | " | 800 | 20 | 22 | a | 20 | " | Vac. | | | | 884 M | 45 |
| 9 | n-C$_5$H$_{12}$ | 800 | 20 | 22 | a | 20 | " | Vac. | 16 | 7.1 | 0 | 757 M | 40 |
| 10 | " | 400 | 0.17 | 36 | None | 1 | " | Air | | | | 194 M | 55 |
| 11 | n-C$_6$H$_{14}$ | " | 0.17 | 50 | " | 1 | " | " | 18.4 | 7.3 | 0 | 402 M | 57 |
| A" | " | " | 0.17 | 67 | " | 1 | " | " | | | | 1 M | 16 |
| A" | " | " | " | " | " | " | " | " | | | | 5 M | 11 |
| 12 | " | 800 | 20 | 22 | a | 20 | " | Vac. | | | | 816 M | 42 |
| 13 | " | 400 | 72 | " | a | 2 | " | Air | | | | 457 M | 61 |
| 14 | n-C$_7$H$_{16}$ | 800 | 20 | " | a | 20 | " | Vac. | 20.4 | 7.5 | 0 | 757 M | 41 |
| 15 | Cyclohexane | 800 | 72 | 22 | a | 20 | 22 | Vac. | 25.5 | 8.2 | 0.1 | 631 M | 43 |
| 16 | n-C$_{10}$H$_{22}$ | " | 72 | " | a | 20 | " | " | 23.9 | 7.8 | 0 | 663 M | 39 |
| 17 | (C$_2$H$_5$)$_2$O | " | 20 | " | a | " | " | " | 17 | 7.7 | 2.5 | 663 M | 51 |
| 18 | " | " | " | " | a | " | " | " | | | | 736 M | 50 |
| 19 | " | 400 | " | " | a | 2 | " | Air | | | | 530 M | 47 |
| 20 | " | " | 0.17 | 35 | None | 1 | " | " | | | | 530 M | 65 |
| 21 | (CH$_3$)$_3$CCl | " | 1 | 22 | a | 1 | " | " | 19.6 | 8.0 | | 91 M | 11 |
| 22 | " | " | 20 | " | a | " | " | " | | | | 189 M | 37 |
| B | Cl$_2$C=CCl$_2$ | " | 0.17 | 50 | None | 24 | " | Vac. | 31.7 | 9.9 | 1.4 | 11 M | 23 |
| C | C$_6$H$_5$CH$_3$ | " | 0.17 | 50 | " | " | " | " | 28.5 | 8.9 | 1.0 | 8 M | 29 |
| D | " | 800 | 20 | 22 | a | " | " | " | | | | 6 M | 34 |
| E | n-C$_3$H$_7$Cl | 400 | 20 | 22 | a | " | " | " | 22 | 8.7 | 1.0 | 11 M | 23 |
| F | CCl$_4$ | " | 24 | 22 | a | 2 | 50 | " | 27 | 8.7 | 0.3 | 166 M | 36 |
| G | Cl$_2$C=CCl$_2$ | 800 | 20 | 25 | a | 20 | 25 | Vac. | | | | 441 M | 55 |
| H | CCl$_4$ | 800 | " | " | " | " | " | " | | | | 481 M | 51 |
| J | Cl$_2$C=CCl$_2$ | 400 | 20 | 22 | a | 20 | 22 | Vac. | | | | 6 M | 41 |

*Solvent Volume/Water Volume in wet fiber.
"Molecular Sieve 3A.

EXAMPLE 23

A bundle of the water-wet cellulose acetate fibers described above, tightly packed, about 1.3 cm. in diameter, 70 cm. long and weighing about 30 g. on a dry basis, was snugly inserted into a comparably dimensioned cylindrical tube which was then installed in a distillation apparatus comprising a boiler with feed means, distillation column, a downwardly disposed watercooled condenser and a receiving vessel, the fiber packed tube being interposed vertically between the condenser and the receiver. 750 Ml. of "Freon" 113 and 50 g. of molecular sieve 3A were added to the boiler. The "Freon" 113 was vaporized, condensed and the condensate allowed to flow down through the water-wet fiber bundle, collecting as a two phase effluent in the receiver. The "Freon" 113 layer of the collected liquid was recycled to the boiler and the water layer discarded. After 4 hours, during which time about 3 liters of dry "Freon" 113 had passed down through the fiber bundle, water was no longer visible in the effluent. The "Freon" 113 was removed from the bundle under reduced pressure at 25° C over a 24 hour period. Tested as described membrane.

2. A process of claim 1 wherein the volatile solvent is selected from aliphatic hydrocarbons and halocarbons.

3. A process of claim 2 wherein the volatile solvent is selected from 1,1,2-trichloro-1,2,2-trifluoroethane, n-hexane and n-heptane.

4. A process of claim 1 wherein the cellulose ester is cellulose acetate.

5. A process of claim 1 wherein the water is removed from the membrane in a substantially continuous manner.

6. A process of claim 1 wherein the water in the membrane is substantially completely removed by replacement of the volatile solvent with which the membrane is contacted.

7. A process of claim 6 wherein an azeotrope of water and the volatile solvent is removed from contact with the membrane, the water removed from the azeotrope, and the resulting volatile solvent returned to contact with the membrane.

8. A process of claim 7 wherein the water is removed from the azeotrope by azeotropic distillation.

9. A process of claim 1 wherein the volatile solvent further comprises a water adsorbent.

* * * * *